US012753262B2

(12) United States Patent
Weidmann et al.

(10) Patent No.: US 12,753,262 B2
(45) Date of Patent: Oct. 6, 2026

(54) PROCESS FOR THE REDUCTION OF REGIOISOMER WHERE THE DOUBLE BOND IS SHIFTED FROM ETHYLENICALLY UNSATURATED ALKOXYLATED ALCOHOLS

(71) Applicant: SIKA TECHNOLOGY AG, Baar (CH)

(72) Inventors: Jürg Weidmann, Winterthur (CH); Jörg Zimmermann, Winterthur (CH); Joachim Glaus, Fehraltdorf (CH)

(73) Assignee: SIKA TECHNOLOGY AG, Baar (CH)

( * ) Notice: Subject to any disclaimer, the term of this patent is extended or adjusted under 35 U.S.C. 154(b) by 668 days.

(21) Appl. No.: 18/028,876

(22) PCT Filed: Dec. 2, 2021

(86) PCT No.: PCT/EP2021/084074
§ 371 (c)(1),
(2) Date: Mar. 28, 2023

(87) PCT Pub. No.: WO2022/128519
PCT Pub. Date: Jun. 23, 2022

(65) Prior Publication Data

US 2023/0374188 A1 Nov. 23, 2023

(30) Foreign Application Priority Data

Dec. 15, 2020 (EP) .................................... 20214389

(51) Int. Cl.
*C08F 290/06* (2006.01)
*C04B 24/26* (2006.01)
*C04B 28/02* (2006.01)
*C08G 65/323* (2006.01)
*C04B 103/40* (2006.01)

(52) U.S. Cl.
CPC ........ *C08F 290/062* (2013.01); *C04B 24/267* (2013.01); *C04B 28/02* (2013.01); *C08G 65/323* (2013.01); *C04B 2103/408* (2013.01)

(58) Field of Classification Search
CPC ............... C08F 290/062; C04B 24/267; C04B 28/02; C08G 65/323
See application file for complete search history.

(56) References Cited

U.S. PATENT DOCUMENTS

2012/0142876 A1 * 6/2012 Kawakami ............ C04B 24/267 526/240

FOREIGN PATENT DOCUMENTS

| | | | |
|---|---|---|---|
| CN | 102421722 | A | 4/2012 |
| EP | 1 437 330 | B1 | 11/2009 |
| EP | 2 465 836 | A1 | 6/2012 |
| EP | 1 103 570 | B1 | 5/2014 |
| EP | 2 152 771 | B1 | 9/2016 |
| EP | 2 465 836 | B1 | 2/2020 |
| WO | 2008/126909 | A1 | 10/2008 |

OTHER PUBLICATIONS

Mar. 2, 2022 International Search Report issued in International Patent Application No. PCT/EP2021/084074.
Mar. 2, 2022 Written Opinion of the International Searching Authority issued in International Patent Application No. PCT/EP2021/084074.

* cited by examiner

*Primary Examiner* — John E Uselding
(74) *Attorney, Agent, or Firm* — Oliff PLC

(57) ABSTRACT

A process for the reduction of the content of a compound I of general formula (II)

(II)

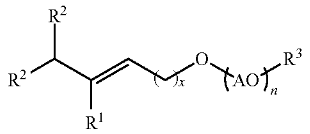

where R1 is hydrogen or methyl, each R2, independently from each other, is hydrogen or methyl, R3 is hydrogen or an aliphatic or cycloaliphatic or aromatic hydrocarbon with 1-8 carbon atoms, AO is a C2-C12 oxyalkylene group, x=0 or 1, and n=2-350, from a mixture including or consisting of a compound I of general formula (II) and an alkoxylated alcohol A of general formula (I)

(I)

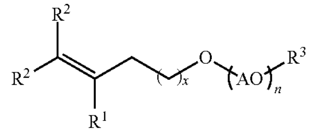

where R1, R2, R3, AO, x, and n are as described in general formula (II) above, characterized in that the process includes a treatment of the mixture including or consisting of a compound I and an alkoxylated alcohol A with an acid. Also, the use of the alkoxylated alcohols A for the production of polycarboxylate ethers.

6 Claims, No Drawings

PROCESS FOR THE REDUCTION OF REGIOISOMER WHERE THE DOUBLE BOND IS SHIFTED FROM ETHYLENICALLY UNSATURATED ALKOXYLATED ALCOHOLS

TECHNICAL FIELD

The present invention relates to a process to reduce the content of regioisomers where the double bond is shifted in ethylenically unsaturated, alkoxylated alcohols. The present invention also relates to the use of ethylenically unsaturated, alkoxylated alcohols with low content of regioisomer where the double bond is shifted for the production of polycarboxylate ethers.

BACKGROUND OF THE INVENTION

Dispersants are used in the construction industry as plasticizers or water-reducing agents for mineral binders and/or mineral binder compositions, such as concrete, mortar, cements, gypsum and lime. Organic polymers are generally used as dispersants. Such organic polymers are added to the mixing water or added as solids to the binder or binder composition. In this way, both the consistency of the binder composition during processing and the properties in the cured state can be changed in an advantageous way. The choice and dosage of a suitable dispersant depends in particular on the specific composition, the processing technique, and the intended use of the binder or binder composition.

In practice, high-performance plasticizers in the form of polycarboxylate ethers (PCE) are often used as dispersants for mineral binders or mineral binder compositions, for example to improve the flow behaviour of mineral binder compositions.

PCE based on ethylenically unsaturated carboxylic acids and alkoxylation products of ethylenically unsaturated alcohols, in particular alkoxylated allyl alcohol, methallyl alcohol and/or isoprenyl alcohol, are particularly useful in many aspects. Such PCE are for example described in EP1437330 (NipponShokubai).

EP 2152771 (Nippon Shokubai) and EP 2465836 (Nippon Shokubai) teach that where an increased content of regioisomers where the double bond is shifted is comprised in alkoxylation products of methallyl alcohol or isoprenyl alcohol, this does reduce the plastification effect of copolymers prepared from acrylic acid and the respective alkoxylated alcohol in cementitious mixtures. In other words, it is desirable for a good plastification effect of polycarboxylate ethers in cementitious mixtures to control and/or reduce the content of regioisomers where the double bond is shifted in the constituting monomers. The EP 2152771 and EP 2465836 teach that a lower reaction temperature in the alkoxylation reaction of methallyl alcohol or isoprenyl alcohol will lead to a reduced amount present of the respective regioisomers where the double bond is shifted. However, a lower reaction temperature is not always desirable, especially where fast reaction is needed. Additionally, it can be desirable to further reduce the content of regioisomers where the double bond is shifted in alkoxylation products of ethylenically unsaturated alcohols after the alkoxylation reaction is terminated.

There is thus a need for processes and methods to control and reduce the content of regioisomers where the double bond is shifted in alkoxylation products of ethylenically unsaturated alcohols. Such processes and methods are especially needed where the respective alkoxylation products are to be used as monomers to produce polycarboxylate ethers.

SUMMARY OF THE INVENTION

It is an object of the present invention to provide ethylenically unsaturated alkoxylated alcohols, especially alkoxylated methallyl alcohol or alkoxylated isoprenyl alcohol, with a low content of regioisomers where the double bond is shifted.

Surprisingly this object could be achieved by a process as claimed in claim 1.

The core of the present invention thus is a process for the reduction of the content of a compound I of general formula (II)

(II)

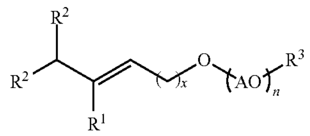

where $R^1$ is hydrogen or methyl, each $R^2$, independently from each other, is hydrogen or methyl, $R^3$ is hydrogen or an aliphatic or cycloaliphatic or aromatic hydrocarbon with 1-8 carbon atoms, AO is a C2-C12 oxyalkylene group, x=0 or 1, and n=2-350, from a mixture comprising or consisting of a compound I of general formula (II) and an alkoxylated alcohol A of general formula (I)

(I)

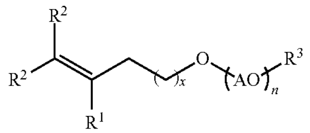

where $R^1$, $R^2$, $R^3$, AO, x, and n are as described in general formula (II) above, characterized in that said process comprises a treatment of said mixture comprising or consisting of a compound I and an alkoxylated alcohol A with an acid.

The alkoxylated alcohols A of general formula (I) with a low content of a compound I of general formula (II) (which corresponds to a regioisomer where the double bond is shifted) can be used as monomers for the production of polycarboxylate ethers (PCE). It was surprisingly found that PCE produced from such monomers show a significantly higher initial slump flow as compared to PCE produced from alkoxylated alcohols A of general formula (I) with a higher content of a compound I of general formula (II). In other words, a reduced content of a compound I of general formula (II) in a monomer mixture used for the production of PCE leads to a higher initial slump flow of a cementitious composition comprising such PCE.

Preferred embodiments of the present invention are subject of the dependent claims. Further aspects of the present invention are subject of the independent claims.

WAYS OF CARRYING OUT THE INVENTION

In a first aspect the present invention relates to a process for the reduction of the content of a compound I of general formula (II)

(II)

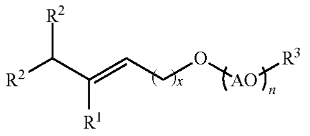

where $R^1$ is hydrogen or methyl, each $R^2$, independently from each other, is hydrogen or methyl, $R^3$ is hydrogen or an aliphatic or cycloaliphatic or aromatic hydrocarbon with 1-8 carbon atoms, AO is a C2-C12 oxyalkylene group, x=0 or 1, and n=2-350, from a mixture comprising or consisting of a compound I of general formula (II) and an alkoxylated alcohol A of general formula (I)

(I)

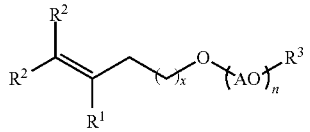

where $R^1$, $R^2$, $R^3$, AO, x, and n are as described in general formula (II) above, characterized in that said process comprises a treatment of said mixture comprising or consisting of a compound I and an alkoxylated alcohol A with an acid.

The term "reduction of the content of a compound I" within the present context means that the content of such compound I in the respective mixture is reduced after carrying out the process of the present invention as compared to the content of such compound I before carrying out the process of the present invention. According to preferred embodiments, the content of a compound I of general formula (II) as described above in a mixture comprising or consisting of a compound I of general formula (II) and an alkoxylated alcohol A of general formula (I) as described above is reduced to not more than 10 wt.-%, preferably not more than 5 wt.-%, more preferably not more than 1 wt.-%, still more preferably not more than 0.5 wt.-%, especially not more than 0.1 wt.-%, in each case relative to the total dry weight of the alkoxylated alcohol A of general formula (I).

The content of the compound I of general formula (II) in a mixture comprising a compound I of general formula (II) and an alkoxylated alcohol A of general formula (I) can be measured by HPLC. Any suitable HPLC method known to the person skilled in the art may be used within the present context. A preferred HPLC protocol is as follows: stationary phase: column MGII 100 Å, 5 μm, 10 mm (I.D.)×250 mm manufactured by Shiseido Fine Chemicals; mobile phase: mixture of acetonitrile and water (45:55 by volume); sample preparation: 10% solution of sample in the eluent; mode: inject 100 μL of sample, measure at a flow rate of 1.0 mL/min, at a column temperature of 40° C.; detector: Waters 2414 RI detector; analysis software: Empower 2 by Waters.

Another method to measure the content of the compound I of general formula (II) in a mixture comprising a compound I of general formula (II) and an alkoxylated alcohol A of general formula (I) is $^1$H-NMR.

Within the present context the compound I of general formula (II) as well as the alkoxylated alcohol A of general formula (I) are meant to encompass both, the respective cis and trans isomers. That means, that the compound I as well as the alkoxylated alcohol A comprises a double bond which is either in the cis-configuration or the trans-configuration or a mixture of cis- and trans-configuration.

According to preferred embodiments, in the above formulae (I) and (II), $R^1$ is methyl, $R^2$ are hydrogen, $R^3$ is hydrogen, AO is an oxyethylene group or an oxypropylene group, x=0 or 1, and n=2-350. It is thus preferred that the alkoxylated alcohol A is an ethoxylated methallyl alcohol or an ethoxylated isoprenyl alcohol or a propoxylated methallyl alcohol or a propoxylated isoprenyl alcohol. The compound I thus is preferably an ethoxylated isomethallyl alcohol or an ethoxylated prenyl alcohol or a propxylated isomethallyl alcohol or a propoxylated prenyl alcohol.

It is possible to carry out a process of the present invention in substance. That is, it is possible for a process of the present invention to be a process for the reduction of the content of a compound I of general formula (II) as described above from a mixture consisting of a compound I of general formula (II) and an alkoxylated alcohol A of general formula (I) as described above where said mixture is treated with an acid. Where a mixture consisting of a compound I of general formula (II) and an alkoxylated alcohol A of general formula (I) is a solid at room temperature, such solid preferably is heated above its melting or softening point to carry out the process of the present invention. However, it is generally preferred, that a process of the present invention is carried out in a solution or dispersion of the mixture of a compound I of general formula (II) and an alkoxylated alcohol A of general formula (I) in a liquid medium, preferably water. This allows for an especially efficient reaction.

According to preferred embodiments, the process of the present invention is thus characterized in that the mixture comprising a compound I of general formula (II) and an alkoxylated alcohol A of general formula (I) is a solution or a dispersion of a compound I of general formula (II) and an alkoxylated alcohol A of general formula (I) in a liquid, preferably water.

According to embodiments, the acid to be used in a process of the present invention has a pKa value of not more than 4.5, preferably not more than 2, more preferably not more than 0.

The acid can be a mineral acid, an organic acid, or a mixture thereof. It is preferred that the acid is a non-oxidizing acid. Especially, the acid can be selected from the group consisting of hydrohalic acids, preferably hydrochloric acid or hydrobromic acid, perchloric acid, chloric acid, iodic acid, sulfuric acid, sulfonic acids, preferably methane sulfonic acid or para-toluene sulfonic acid, nitrous acid, phosphoric acid, oxalic acid, chloroacetic acid, trifluoroacetic acid, citric acid, formic acid, lactic acid, ascorbic acid, benzoic acid, picric acid, maleic acid, acrylic acid, silicates, preferably H-zeolites. It is especially preferred that the acid is chosen from the group consisting of hydrochloric acid, phosphoric acid, citric acid, and ascorbic acid.

According to embodiments, the acid can be used in a liquid form. A liquid form can be the pure acid in liquid form or a solution or dispersion of the acid in a liquid, especially in water. Preferred acids in liquid form are hydrochloric acid in water, phosphoric acid in water, maleic acid in water, oxalic acid, formic acid, and acrylic acid. According to other embodiments, the acid can also be in the form of a solid. The use of a solid acid can be advantageous as its removal from a mixture comprising a compound I of general formula (II) and an alkoxylated alcohol A of general formula (I) is simple. A solid acid may be a pure acid which is solid under the reaction conditions of a process of the present invention. A solid acid may also be an acid attached to a solid support or an acid adsorbed on a solid support. Suitable solid support materials include polystyrene, polyethylene glycol, polyacrylate, cellulose, silica, glass, and sheet silicates. Preferred acids in solid form are para-toluene sulfonic acid on solid support, citric acid, maleic acid, and H-zeolithes.

Where the process of the present invention is carried out in solution or dispersion of the mixture of a compound I of general formula (II) and an alkoxylated alcohol A of general formula (I) in water, it is preferred that the pH during the treatment with acid is equal to or lower than 3.5, preferably 3.0, more preferably 2.5, especially 2.0.

The process of the present invention can be carried out by any means known to the person skilled in the art. It is generally preferred to add the acid to the mixture comprising or consisting of a compound I of general formula (II) and an alkoxylated alcohol A of general formula (I). Addition of the acid can be by any conventional means. It is, for example, possible to add the acid for the treatment to the mixture comprising or consisting of a compound I of general formula (II) and an alkoxylated alcohol A of general formula (I) in a storage tank, in a container, or in a reaction vessel. The process of the present invention can be carried out with or without stirring. It is preferred that the process of the present invention is carried out with stirring. Stirring refers to stirring of the mixture comprising or consisting of a compound I of general formula (II) and an alkoxylated alcohol A prior to addition of the acid, during addition of the acid and/or for a defined reaction period after addition of the acid. The duration of the acid treatment is not particularly limited. According to embodiments, the treatment of the mixture comprising or consisting of a compound I of general formula (II) and an alkoxylated alcohol A with an acid is carried out for a duration between 5 min and 24 hours, preferably 10 min and 12 hour, especially 30 min and 6 hours. It is possible to carry out the treatment of the mixture comprising or consisting of a compound I of general formula (II) and an alkoxylated alcohol A with an acid in a wide temperature range and especially at elevated temperature. It is, however, preferable to carry out the treatment of the mixture comprising or consisting of a compound I of general formula (II) and an alkoxylated alcohol A with an acid at a temperature between 15-100° C. and at a pressure of 1013 mbar. According to embodiments, a process of the present invention is thus characterized in that the acid treatment is carried out at a temperature of between 15-100° C. and a pressure of appr. 1013 mbar. It is also possible to carry out the acid treatment at a reduced pressure.

A process of the present invention may consist of a treatment of the mixture comprising or consisting of a compound I of general formula (II) and an alkoxylated alcohol A with an acid. It is, however, also possible for a process of the present invention to comprise further steps. Such further steps may in particular be selected from one or more of the following:

(i) alkoxylation of an alcohol to obtain an alkoxylated alcohol of general formula (I),
(ii) melting of a mixture consisting of a compound I of general formula (II) and an alkoxylated alcohol A of the general formula (I),
(iii) preparation of a solution or dispersion of a mixture comprising or consisting of a compound I of general formula (II) and an alkoxylated alcohol A of the general formula (I) in a liquid, especially in water,
(iv) neutralization of the acid.

According to preferred embodiments, a process of the present invention is thus characterized in that it comprises of consists of the following steps:

(i) optionally alkoxylation of an alcohol to obtain an alkoxylated alcohol of general formula (I),
(ii) optionally melting of a mixture consisting of a compound I of general formula (II) and an alkoxylated alcohol A of the general formula (I),
(iii) optionally preparation of a solution or dispersion of a mixture comprising or consisting of a compound I of general formula (II) and an alkoxylated alcohol A of the general formula (I) in a liquid, especially in water,
(iv) treatment of the mixture comprising or consisting of a compound I of general formula (II) and an alkoxylated alcohol A with an acid,
(v) optionally neutralization of the acid.

A particularly preferred process of the present invention consists of the following steps:

(i) alkoxylation of an alcohol to obtain an alkoxylated alcohol of general formula (I),
(ii) preparation of a solution or dispersion of a mixture comprising or consisting of a compound I of general formula (II) and an alkoxylated alcohol A of the general formula (I) in a liquid, especially in water,
(iii) treatment of the mixture comprising or consisting of a compound I of general formula (II) and an alkoxylated alcohol A with an acid, and
(iv) optionally neutralization of the acid.

All features described above as preferred in the treatment of the mixture comprising or consisting of a compound I of general formula (II) and an alkoxylated alcohol A with an acid are also to be understood as being preferred features of a process comprising or consisting of the steps (i)-(v) as described above.

In a second aspect the present invention relates to a monomer mixture, especially a monomer mixture for the production of polycarboxylate ether (PCE), obtainable by a process as described above.

Especially, in a monomer mixture of the present invention the content of a compound I of general formula (II) is not more than 10 wt.-%, preferably not more than 5 wt.-%, more preferably not more than 1 wt.-%, still more preferably not more than 0.5 wt.-%, especially not more than 0.01 wt.-%, in particular below 0.01 wt.-% in each case relative to the total dry weight of the alkoxylated alcohol A of general formula (I) in said monomer mixture.

The monomer mixture of the present invention may contain further monomers besides a compound I of general formula (II) and an alkoxylated alcohol A of the general formula (I) as described above. Such further monomers especially are carboxylic acids comprising an ethylenically unsaturated bond. Such ethylenically unsaturated carboxylic acids preferably are selected from acrylic acid, methacrylic acid, maleic acid, and mixtures thereof. Optionally the monomer mixture of the present invention may contain further monomers selected from the group consisting of alkyl esters and hydroxyalkyl esters of ethylenically unsaturated carboxylic acids, amides of acrylic acid or methacrylic acid, styrene and its derivatives, vinylalcohols, vinylpyrrolidone, and mixtures thereof. A monomer mixture of the present invention therefore comprises or consists of monomers selected from the group consisting of a compound I of general formula (II), an alkoxylated alcohol A of the general formula (I), at least one ethylenically unsaturated carboxylic acid, preferably acrylic acid, methacrylic acid and/or maleic acid, and optionally further monomers selected from the group consisting of alkyl esters and hydroxyalkyl esters of ethylenically unsaturated carboxylic acids, amides of acrylic acid or methacrylic acid, styrene and its derivatives, vinylalcohols and/or vinylpyrrolidone.

According to embodiments, the monomer mixture of the present invention thus comprises or essentially consists of an alkoxylated alcohol A of general formula (I)

(I)

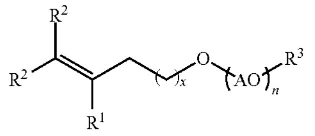

where $R^1$ is hydrogen or methyl, each $R^2$, independently from each other, is hydrogen or methyl, $R^3$ is hydrogen or an aliphatic or cycloaliphatic or aromatic hydrocarbon with 1-8 carbon atoms, AO is a C2-C12 oxyalkylene group, x=0 or 1, and n=2-350, and wherein the content of a compound I of general formula (II)

(II)

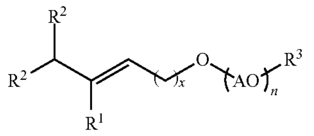

where $R^1$, $R^2$, $R^3$, AO, x, and n are as described in general formula (I) above, is not more than 10 wt.-%, preferably not more than 5 wt.-%, more preferably not more than 1 wt.-%, still more preferably not more than 0.5 wt.-%, especially not more than 0.01 wt.-%, in particular below 0.01 wt.-%, in each case relative to the total dry weight of the alkoxylated alcohol A of general formula (I) in said monomer mixture.

The monomer mixture of the present invention may additionally comprise an alkoxylated alcohol of the general formula (V)

(V)

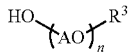

where $R^3$, AO, and n are as described in general formula (II) above.

In a third aspect the present invention relates to the use of a monomer mixture as described above for the production of polycarboxylate ethers (PCE) by a process of free radical polymerization. Suitable condition for the production of PCE by free radical polymerisation are known to the person skilled in the art and are for example described in EP1437330 (examples 1-1 to 3-3) or in EP1103570 (examples 1-1 to 1-13).

In a particularly preferred embodiment of the present invention the monomer mixture as described above is copolymerized with an ethylenically unsaturated carboxylic acid selected from maleic acid, acrylic acid, methacrylic acid, and mixtures thereof.

According to embodiments, maleic acid and acrylic acid may be used as the acid for the treatment of a mixture of a compound I of general formula (II) and an alkoxylated alcohol A of general formula (I) to reduce the content of the compound I and as a monomer for the production of PCE. It is, however, preferred that the ethylenically unsaturated carboxylic acid selected from maleic acid, acrylic acid, methacrylic acid, and mixtures thereof is different from the acid used for the treatment of a mixture of a compound I of general formula (II) and an alkoxylated alcohol A of general formula (I) to reduce the content of the compound I.

According to a fourth aspect the present invention relates to a copolymer obtained by a process of free radical polymerization of a monomer mixture as described above and at least one ethylenically unsaturated carboxylic acid selected from maleic acid, acrylic acid, methacrylic acid, and mixtures thereof.

Such copolymers comprise or essentially consist of a) repeating units M-1 of the general formula (III)

(III)

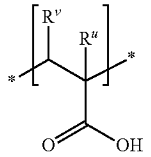

and b) repeating units M-2 of the general formula (IV)

(IV)

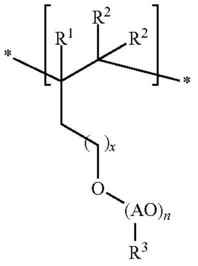

where each $R^v$ independently of each other is hydrogen or COOM, where M is hydrogen, an alkali metal or an alkali earth metal, each $R^1$ and $R^u$ independently from each other is hydrogen or methyl, each $R^2$, independently from each other, is hydrogen or methyl, $R^3$ is hydrogen or an aliphatic or cycloaliphatic or aromatic hydrocarbon with 1-8 carbon atoms, AO is a C2-C12 oxyalkylene group, x=0 or 1, and n=2-350, and where the molar ratio of repeating units M1 to repeating units M-2 in the copolymer is between 90:10-10:90.

The repeating units M-1 and/or M-2 can be arranged along the backbone of the copolymer in a random, statistical manner, or in a block-wise manner, or in a mixture of random and block-wise manner, for example in a gradient-wise manner.

According to a fifth aspect the present invention relates to the use of a copolymer as described above as dispersant for mineral binders and/or mineral binder compositions.

Within the context of the present invention a "mineral binder composition" is a composition comprising at least one mineral binder. The term "mineral binder" refers in particular to a binder which reacts in the presence of water in a hydration reaction to form solid hydrates or hydrate phases. This can be a hydraulic binder (e.g. cement or mineral lime), or a non-hydraulic binder (e.g. white lime).

Examples of mineral binders are cements such as Portland cement, blended cements, calcium aluminate cements, calcium sulphoaluminate cements, as well as gypsum, and/or lime.

In particular, the mineral binder or binder composition comprises a hydraulic binder, especially cement. The cement is preferably chosen from at least one cement of the group consisting of CEM I, II, III, IV or V (according to standard EN 197-1), calcium aluminate cement (according to the standard EN 14647:2006-01), and calcium sulphoaluminate (CSA) cement. Of course, cements produced according to relevant alternative standards, for example the relevant ASTM or Chinese standards, are likewise suitable.

It may also be advantageous if the mineral binder or mineral binder composition comprises other binders in addition to or instead of a hydraulic binder. These are in particular latent hydraulic binders and/or pozzolanic binders. Calcium sulfate may be added to a mineral binder composition of the present invention in small amounts to compensate for the loss of sulfate during hydration. Small amounts mean 0.1-5 wt.-%, preferably 0.1-1.5 wt.-% of calcium sulfate, based on the total weight of the mineral binder.

Gypsum is meant to encompass calcium sulfate dihydrate, α- and β-calcium sulfate hemihydrate, and/or anhydrite.

Lime is any material as described in standard EN 459-1:2015.

Besides the mineral binder, a mineral binder composition typically also comprises inert substances such as aggregates, especially gravel and/or sand, and/or fillers such as limestone or quartz flour. Water may additionally be present.

In a last aspect, the present invention relates to a mineral binder or a mineral binder composition comprising a copolymer as described above. Especially, the mineral binder or the mineral binder composition is as described above.

The following examples are illustrative and will provide the person skilled in the art with additional information to carry out the present invention. They are not meant to limit the present invention in any way.

EXAMPLES

HPLC Measurements

HPLC measurements were done using a column MGII 100 ↑, 5 μm, 10 mm (I.D.)×250 mm manufactured by Shiseido Fine Chemicals. The eluent was a mixture of acetonitrile and water (45:55 by volume). The sample to be measured was a 10% solution in the eluent. 100 μL of sample were injected and the measurement was done at a flow rate of 1.0 mL/min at a column temperature of 40° C. The detector used was a Waters 2414 RI detector. The analysis software was Empower 2 by Waters Sampling. Generally, the compound I of general formula (II) has a higher retention time as compared to the alkoxylated alcohol A of the general formula (I).

The content of the compound I of general formula (II) can be calculated from the surface area ratio in the chromatogram by using the following equation:

$$c_I=[SA_I/(SA_I+SA_A)]*100$$

where $c_I$=content of the compound I of general formula (II), $SA_I$=surface area of the compound I of general formula (II), $SA_A$=surface area of the alkoxylated alcohol A of the general formula (I).

Preparation of HPEG Solutions 1-5

Aqueous solutions of methallyl-started polyethyleneoxide (HPEG with molecular mass Mw=2400 g/mol) were prepared by dissolving 220 g of HPEG in 220 g of water. To these solutions was added aqueous HCl (1M) to adjust the pH to the values as indicated in the below table 1. The respective solutions were stirred for 12 h at 23° C. to yield HPEG solutions 1-5, and then HPLC measurements were performed as described above to determine the isomer content. In the HPLC chromatogram, the Isomethallyl-isomer of HPEG was visible at about 26.2 min retention time and the HPEG main isomer was visible at about 20.5 min. The isomer content of the HPEG solutions 1-5 are indicated in the below table 1.

The treated HPEG solutions 1, 1a, 1b, 1c, 1d, and 5 were subsequently used to prepare polymers P1, P1a, P1b, P1c, P1d, and P5. An aqueous solution of HPEG (50% solids content, Mw=2400 g/mol) without acid treatment (reference, not according to the invention, pH=7) was used to prepare reference polymer $P_{ref}$.

Preparation of Polymers P1, P1a, P1b, P1c, P1d, P5, and $P_{ref}$

A glass reactor with a thermometer, a stirrer, a dropping funnel, and a reflux condenser was charged with 460 g of the respective aqueous HPEG solution 1, 1a, 1b, 1c, 1d, 5, or the reference prepared as described above. The pH of the respective solution was adjusted with 1M NaOH or 1M HCl to 4.5. Thereto, a mixture of 3 g hydrogen peroxide (35%) and 7 g water, a mixture of 34 g acrylic acid and 55 g water, and a mixture of 2 g of natriumhydroxymethansulfinate and 11 g of water were added in parallel over a period of 60 minutes. Thereafter, the temperature was raised to 65° C. and kept for 60 minutes to complete the polymerization reaction. Polymers P1, P1a, P1b, P1c, P1d, P5, and $P_{ref}$ were thus obtained in aqueous solution. $P_{ref}$ is not according to the present invention. The aqueous solutions of polymers P1, P1a, P1b, P1c, P1d, P5, and $P_{ref}$ were further diluted with water to a solid content of 20%.

Preparation of Mortar Mixtures 1, 1a, 1b, 1c, 1d, 5, and Reference

Mortar mixtures 1, 1a, 1b, 1c, 1d, 5, and Reference were prepared by mixing 750 g cement (CEM II A-LL 42.5 N from Vigier), 141 g limestone (Nekafill 15 from Kalkfabrik Netstal AG), and 3000 g aggregates (particle size 0-8 mm) in a dry state for 30 seconds in a Hobart mixer. 37.5 g of the respective aqueous solution of polymer P1, P1a, P1b, P1c, P1d, P5, and $P_{ref}$ as described above were added to the dry mix (the resulting w/c ratio was 0.42, the resulting dosage of the respective polymer was 1% by weight of cement). The mortar mixtures 1 and 5 correspond to examples 1 and 5 of below table 1 which are according to the present invention. The reference mortar mixture corresponds to the Reference in below table 1 which is not according to the present invention.

Slump flow of the respective mortar mixtures were measured according to EN 12350-5 after the times indicated in table 1.

TABLE 1 results of measurements

| Example | pH of HPEG solution | Content of HPEG-isomer [mol %] | Slump flow of mortar mixture [mm] 0 min | 30 min | 60 min | 90 min |
|---|---|---|---|---|---|---|
| 1 | 2.0 | 0 | 238 | 225 | 190 | 155 |
| 1a | 1.95 | 0.005 | 235 | 226 | 193 | 156 |
| 1b | 2.0 | 0.015 | 237 | 227 | 196 | 158 |

TABLE 1-continued results of measurements

| Example | pH of HPEG solution | Content of HPEG-isomer [mol %] | Slump flow of mortar mixture [mm] 0 min | 30 min | 60 min | 90 min |
|---|---|---|---|---|---|---|
| 1c | 2.0 | 0.1 | 236 | 227 | 192 | 156 |
| 1d | 2.1 | 0.2 | 236 | 224 | 190 | 155 |
| 2 | 2.5 | 0.7 | n.m. | n.m. | n.m. | n.m. |
| 3 | 3.0 | 2.2 | n.m. | n.m. | n.m. | n.m. |
| 4 | 3.5 | 3.0 | n.m. | n.m. | n.m. | n.m. |
| 5 | 4.5 | 4.8 | 225 | 216 | 189 | 159 |
| Reference* | 7 | 10.2 | 210 | 202 | 185 | 161 |

*the reference is the aqueous HPEG solution (50% solids content, Mw = 2400 g/mol) without any acid treatment
n.m.: not measured As can be seen from the above table 1 a reduced isomer content in the starting HPEG solution leads to an improved slump flow in a mortar mixture when polymers are used which are based on this HPEG solution. Especially, the initial slump flow is increased as the isomer content is reduced.

The invention claimed is:

1. A process for a reduction of a content of a compound I of general formula (II)

(II)

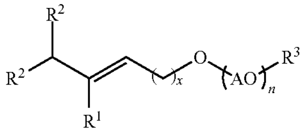

where $R^1$ is hydrogen or methyl, each $R^2$, independently from each other, is hydrogen or methyl, $R^3$ is hydrogen or an aliphatic or cycloaliphatic or aromatic hydrocarbon with 1-8 carbon atoms, AO is a C2-C12 oxyalkylene group, x=0 or 1, and n=2-350, from a mixture comprising a compound I of general formula (II) and an alkoxylated alcohol A of general formula (I)

(I)

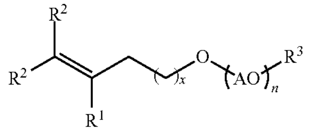

where $R^1$, $R^2$, $R^3$, AO, x, and n are as described in general formula (II) above, wherein the process comprises a treatment of the mixture comprising a compound I and an alkoxylated alcohol A with an acid, wherein the content of a compound I of general formula (II) in a mixture comprising a compound I of general formula (II) and an alkoxylated alcohol A of general formula (I) is reduced to not more than 0.5 wt. % relative to the total dry weight of the alkoxylated alcohol A of general formula (I).

2. The process according to claim 1, wherein the mixture comprising a compound I of general formula (II) and an alkoxylated alcohol A of general formula (I) is a solution or a dispersion of a compound I of general formula (II) and an alkoxylated alcohol A of general formula (I) in a liquid.

3. The process according to claim 1, wherein $R^1$ is methyl, $R^2$ are hydrogen, $R^3$ is hydrogen, AO is an oxyethylene group, x=0 or 1, and n=2-350.

4. The process according to claim 1, wherein the acid has a pKa value of not more than 4.5.

5. The process according to claim 1, wherein the acid is selected from the group consisting of hydrohalic acids, perchloric acid, chloric acid, iodic acid, sulfonic acids, nitric acid, nitrous acid, phosphoric acid, oxalic acid, chloroacetic acid, trifluoroacetic acid, citric acid, formic acid, lactic acid, ascorbic acid, benzoic acid, picric acid, maleic acid, and acrylic acid.

6. The process according to claim 1, wherein the acid treatment is carried out at a temperature of between 15-100° C. and a pressure of 1013 mbar.

* * * * *